Patented Oct. 29, 1935

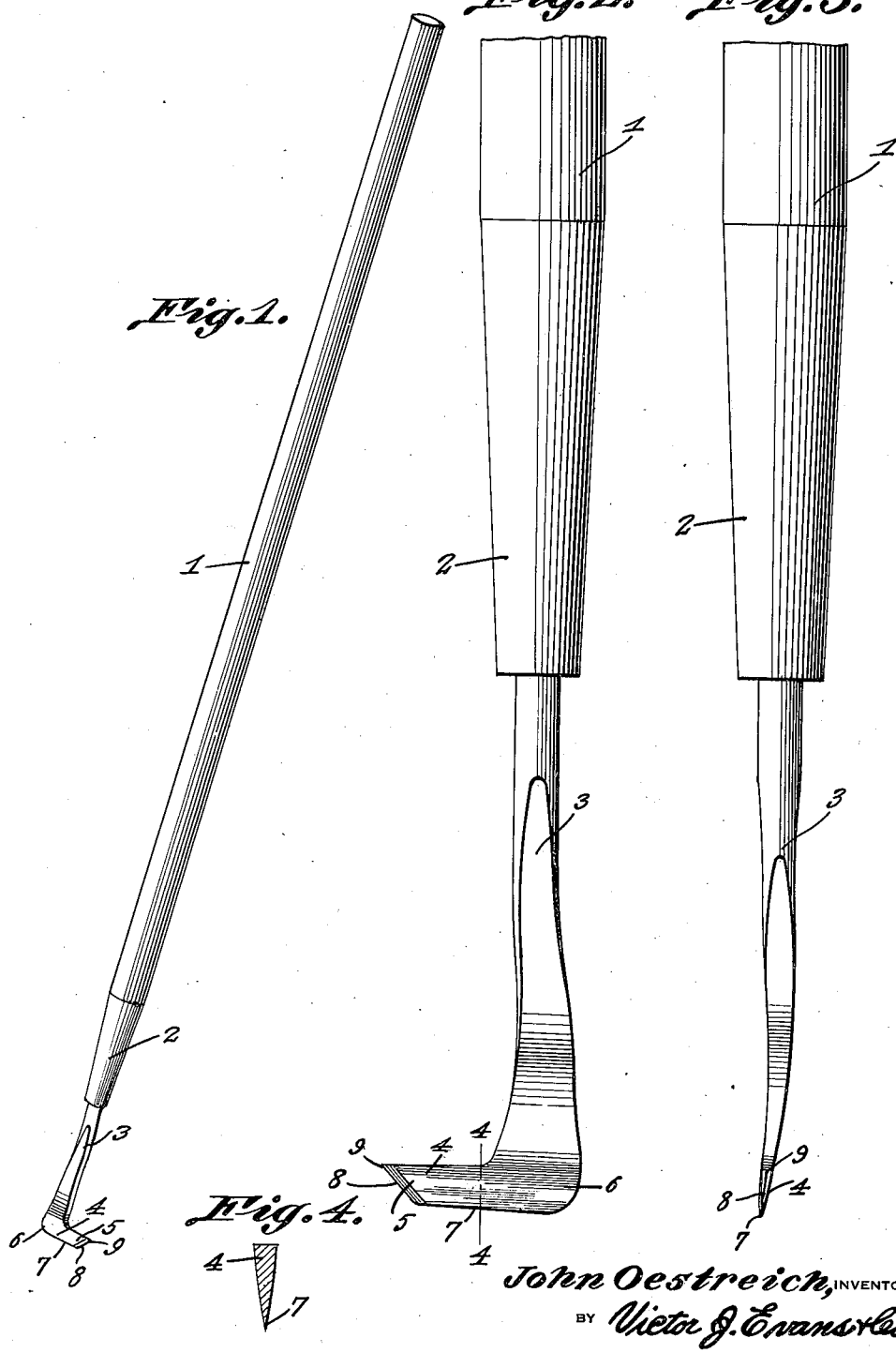

2,019,357

UNITED STATES PATENT OFFICE 2,019,357

WEED DIGGER AND PULLER

John Oestreich, North Platte, Nebr.

Application March 11, 1935, Serial No. 10,570

1 Claim. (Cl. 55—65)

This invention relates to weed diggers and pullers and has for the primary object the provision of a tool so constructed that the roots of weeds may be easily and quickly severed without unduly disturbing the grass of a lawn and said tool may be so constructed that the several weeds may be penetrated and lifted for depositing at a desired place and if desired the tool may be conveniently employed for picking up paper and other rubbish.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating a weed digger and puller constructed in accordance with my invention.

Figure 2 is a fragmentary plan view illustrating the tool.

Figure 3 is a fragmentary plan view of the tool and taken at right angles to that shown in Figure 2.

Figure 4 is a sectional view taken on the line 4—4 of Figure 2.

Referring to the drawing in detail, the numeral 1 indicates a suitable handle carrying a ferrule 2 at one end thereof for the purpose of securing in the handle a shank 3 of a blade 4. The shank is slightly curved, as shown in Figure 3 for positioning the blade which extends at right angles to the shank at a slight angle with respect to the handle. The shank gradually increases in width and decreases in thickness towards its formation to the blade. The blade includes toe and heel portions 5 and 6, respectively, and between said portions the blade tapers to define a cutting edge 7. The blade also is provided with a cutting edge 8 extending angularly to the cutting edge 7 at the toe portion 5 of the blade. The cutting edge 8 being disposed on an angle forms the toe portion with a penetrating point 9.

In use, to cut the roots of weeds the tool is positioned, as shown in Figure 1, bringing the cutting edge 7 into engagement with the roots. The roots are thus severed by the blade without unduly disturbing other growths in the vicinity of the roots. After the cutting of the roots, the pointed end 9 of the blade is caused to penetrate the weeds whence the latter may be lifted and deposited at a desired place. The tool besides being employed for cutting weeds may also be used for picking up paper and other rubbish by pushing the pointed end 9 into the paper or the like. The cutting edge 8 also may be employed for severing roots or growths.

While I have shown and described the preferred embodiment of my invention, it will be understood that minor changes in construction, combination and arrangement of parts may be made without departing from the spirit and scope of my invention, as claimed.

Having described the invention, I claim:

A weed digger and puller comprising a blade including heel and toe portions and tapering towards an edge thereof between said heel and toe portions to provide a cutting edge, an elongated shank being flattened from one end thereof in the direction of its other end to decrease its thickness and to increase its width and having the first-named end thereof integral with the edge of the blade opposite to said cutting edge and at the heel portion, the flattened portion of the shank being curved to position the blade and its cutting edge laterally of the flattened portion of the shank, said blade between the cutting edge and the non-cutting edge and at the toe portion being beveled to define a second cutting edge arranged angularly to the first cutting edge and the non-cutting edge and providing a penetrating point to said blade, and means securing the shank to a handle.

JOHN OESTREICH.